US012649566B1

(12) United States Patent
Wiegers et al.

(10) Patent No.: US 12,649,566 B1
(45) Date of Patent: Jun. 9, 2026

(54) APPARATUS AND METHOD FOR TRIMMING AN AIRCRAFT STABILIZER

(71) Applicant: Textron Aviation Inc., Wichita, KS (US)

(72) Inventors: Robert Glynn Wiegers, Wichita, KS (US); Jeremy Phillip Taylor, Bel Aire, KS (US)

(73) Assignee: Textron Aviation Inc., Wichita, KS (US)

( * ) Notice: Subject to any disclaimer, the term of this patent is extended or adjusted under 35 U.S.C. 154(b) by 0 days.

(21) Appl. No.: 19/051,779

(22) Filed: Feb. 12, 2025

(51) Int. Cl.
*B64C 5/02* (2006.01)
*B64C 5/16* (2006.01)

(52) U.S. Cl.
CPC . *B64C 5/02* (2013.01); *B64C 5/16* (2013.01)

(58) Field of Classification Search
CPC .... B64C 5/02; B64C 5/10; B64C 5/12; B64C 5/16; B64C 9/00; B64C 9/02; B64C 9/08; B64C 1/26; B64C 1/30; B64C 37/00
See application file for complete search history.

(56) References Cited

U.S. PATENT DOCUMENTS

| | | | | |
|---|---|---|---|---|
| 3,240,448 | A * | 3/1966 | Schaffer | B64C 9/02 244/87 |
| 3,966,142 | A * | 6/1976 | Corbett | B64C 1/30 244/12.4 |
| 5,201,478 | A * | 4/1993 | Wooley | B64C 1/00 244/89 |
| 11,772,809 | B2 * | 10/2023 | Stangl | B64C 15/02 239/265.33 |
| 2009/0289144 | A1 | 11/2009 | Koneczny | |
| 2012/0298795 | A1 * | 11/2012 | Cazals | B64C 9/32 244/87 |
| 2020/0094939 | A1 * | 3/2020 | Barmichev | B64C 5/16 |
| 2020/0255119 | A1 * | 8/2020 | White | B64C 5/02 |

* cited by examiner

*Primary Examiner* — Joshua J Michener
*Assistant Examiner* — Colin Zohoori
(74) *Attorney, Agent, or Firm* — Hovey Williams LLP

(57) ABSTRACT

An aircraft structure includes a fuselage, a tail structure, a hinge support structure, and at least one internal actuator. The tail structure is pivotally attached to the fuselage and includes a tailcone and horizontal stabilizers fixed to the tailcone. Each of the horizontal stabilizers have a stabilizer leading edge and a stabilizer trailing edge and extend in opposite directions from the tailcone, forming an H-tail or a U-tail configuration. The hinge support structure is fixed at least partially within the fuselage, pivotally coupling the fuselage and the tail structure. The at least one internal actuator actuates the tail structure, rotating the stabilizer leading edge up and down relative to the fuselage, thereby trimming the horizontal stabilizers for aircraft stabilization.

16 Claims, 5 Drawing Sheets

APPARATUS AND METHOD FOR TRIMMING AN AIRCRAFT STABILIZER

BACKGROUND OF THE INVENTION

In aviation, horizontal and/or vertical stabilizers are used at the aft end of an aircraft to provide horizontal stabilization and/or vertical stabilization. For example, some aircrafts may include a fuselage with a tailcone region having a T-tail or a cruciform tail that includes a vertical stabilizer jutting upward from the tailcone and two horizontal stabilizers that are substantially perpendicular relative to the vertical stabilizer, jutting outward in opposite directions from each other. The horizontal stabilizers can be "trimmed" or modulated to change their angle of attack and subsequently the lift characteristics of the horizontal stabilizers to reduce required elevator travel and control forces. Trimmed or modulated horizontal stabilizers also keep the aircraft trimmed through various speeds, thereby reducing drag.

For modulated traditional vertical and horizontal stabilizer configurations, such as the T-tail, cruciform tail, and/or other conventional tails, actuation methods are well known. However, for non-traditional configurations (e.g., H-tail, V-tail, and U-Tail), the previous methods of control are not viable for smaller aircraft. For example, the tailcone of an H-tail configuration may be too small in cross-sectional diameter for locating desired actuators and hinges therein to trim the horizontal stabilizer portions of the H-tail. Furthermore, as the horizontal stabilizer portions of the H-tail are actuated, an undesired gap would then exist between the curvature of the small tailcone and the pivoting horizontal stabilizer.

Thus, there is a need for an aircraft stabilizer, such as a horizontal stabilizer configuration that overcomes the deficiencies of the prior art.

SUMMARY OF THE INVENTION

Embodiments of the current invention address one or more of the above-mentioned problems and provide a distinct advance in the art of aircraft stabilizers. Specifically, an apparatus for stabilizing an aircraft may be an aircraft structure including a fuselage, a tail structure, and internal actuators. The tail structure may be pivotally attached to the fuselage and include a tailcone and at least two stabilizers fixed to the tailcone. The internal actuators may pivot the tail structure up and down about a single axis relative to the fuselage, thereby trimming the stabilizers for vertical and/or horizontal stabilization of the aircraft structure during flight.

In another embodiment, an aircraft structure includes a fuselage, a tail structure, a hinge support structure, and at least one internal actuator. The tail structure is pivotally attached to the fuselage and includes a tailcone and horizontal stabilizers fixed to the tailcone. Each of the horizontal stabilizers have a stabilizer leading edge and a stabilizer trailing edge and extend in opposite directions from the tailcone, forming an H-tail or a U-tail configuration. The hinge support structure is fixed at least partially within the fuselage, pivotally coupling the fuselage and the tail structure. The at least one internal actuator actuates the tail structure, rotating the stabilizer leading edge up and down relative to the fuselage, thereby trimming the horizontal stabilizers for aircraft stabilization.

In one example method, trimming an aircraft stabilizer may include sending a control signal to at least one internal actuator, receiving the control signal with the at least one internal actuator, and activating actuation of the at least one internal actuator in response to receiving the control signal. The at least one internal actuator rotates a tail structure up or down relative to the fuselage when actuated. The tail structure is pivotally attached to the fuselage and includes a tailcone aligned with a trailing end of the fuselage and horizontal stabilizers fixed to the tailcone. The horizontal stabilizers extend in opposite directions from the tailcone, forming an H-tail or a U-tail configuration.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF DRAWINGS

Embodiments of the current invention are described in detail below with reference to the attached drawing figures, wherein.

Figure 1:
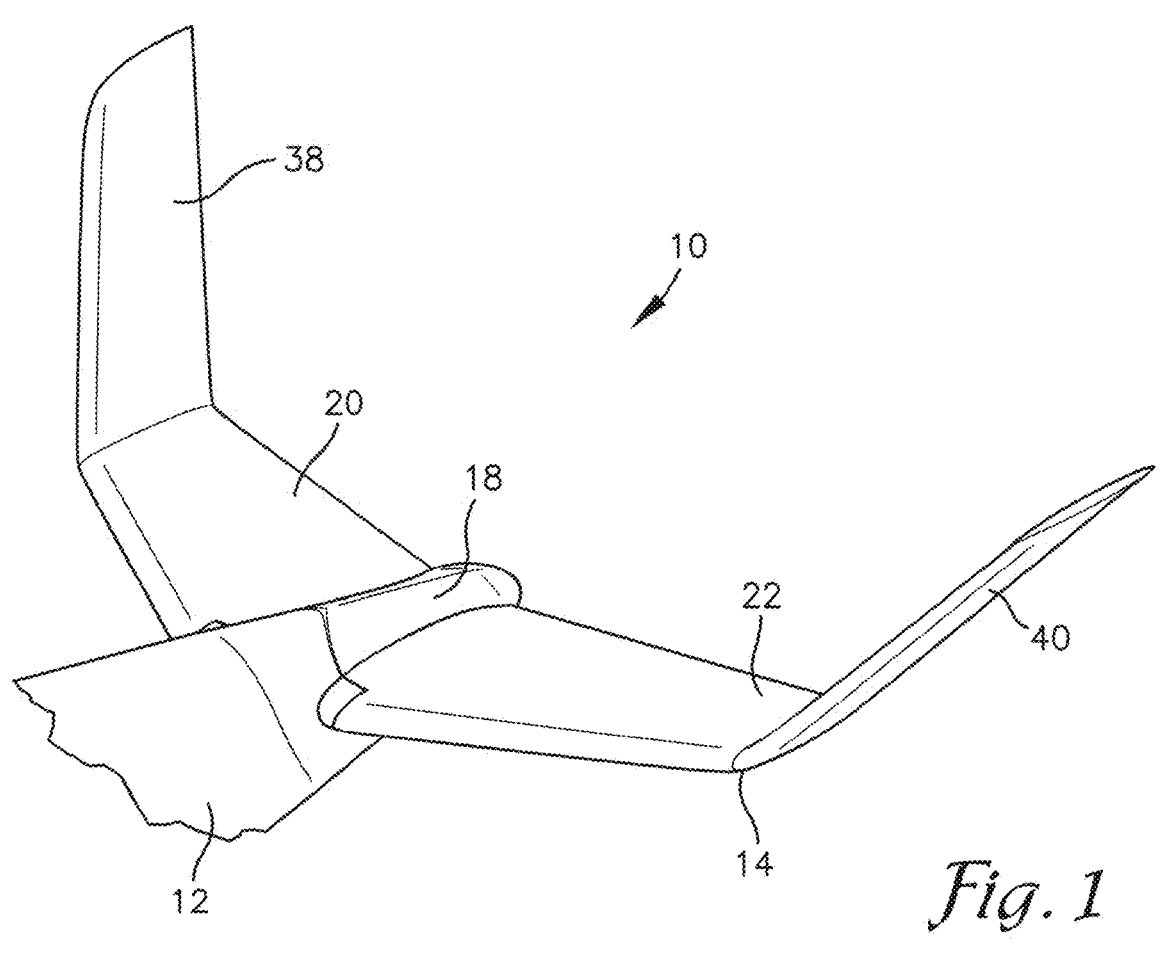
FIG. 1 is a top perspective view of a tail portion of a U-tailed aircraft constructed in accordance with embodiments of the present disclosure.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE INVENTION

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

A traditionally actuated horizonal stabilizer generally utilizes an actuator to modulate horizontal stabilizers while a vertical stabilizer stays fixed (such as is found on a T-tail or a cruciform tail). The horizontal stabilizer sweeps along a side surface of the vertical stabilizer utilizing a "wiper" which provides a flat area for the horizontal stabilizer to stay sealed against and minimize drag impact. With the vertical stabilizer(s) being attached to the horizontal stabilizer tips in other tail configurations (e.g., U-tail, H-tail, and V-tail), the entire horizontal and vertical assembly would need to be modulated. For aircraft with a thin loft at an aft end of its fuselage (e.g., at an end of a tailcone), it becomes very difficult to fit an actuator, hinge, and yaw fitting within the fuselage for controlling positions/angles of the stabilizers. There is also no flat portion of the loft to sweep the stabilizer against when it is actuated, which causes non-optimal higher drag solutions. To alleviate this issue, the present disclosure describes fixing the stabilizers to a tailcone portion at an aft end of the fuselage and pivoting the stabilizers by pivoting the tailcone portion relative to the remainder of the fuselage, as described below.

As depicted in FIGS. 1-6, in one or more embodiments described herein, an apparatus for stabilizing an aircraft may include an aircraft structure 10 comprising: a fuselage 12, a tail structure 14, and at least one internal actuator 16. The tail structure 14 is a tail stabilizer structure pivotally attached to the fuselage 12 and includes a tailcone 18 and at least two stabilizers 20,22 fixed to the tailcone 18. The internal actuator 16 may pivot the tail structure 14 up and down about a single axis relative to the fuselage 12, thereby trimming the stabilizers 20,22 for vertical and/or horizontal stabilization of the aircraft structure 10 during flight. The aircraft structure 10 may also include a hinge support structure 24 and/or at least one pivot point 26 (e.g., a hinge or the like). In some embodiments, the hinge support structure 24 further comprises and/or is affixed to at least one of a yaw support structure 28 and a yaw fitting 30 to counteract yaw movement of the tail structure 14.

The fuselage 12 may be any fuselage known in the art, including frame pieces and outer skin forming a main body of an aircraft. The fuselage may house various aircraft control systems, a cockpit, a main cabin for passengers, and other compartments or components of an aircraft, with wings attached at opposing sides of the fuselage at a location between a front nose and a fuselage trailing end 32. Traditionally, the fuselage trailing end would be a fixed tailcone closing out the traditional fuselage. However, in various embodiments described herein, the fuselage trailing end 32 may have an open or at least partially open configuration, and the fuselage trailing end 32 may have a concave arcuate shape to match with at least a portion of the tail structure and/or the tailcone thereof, as later described herein.

Figure 2:
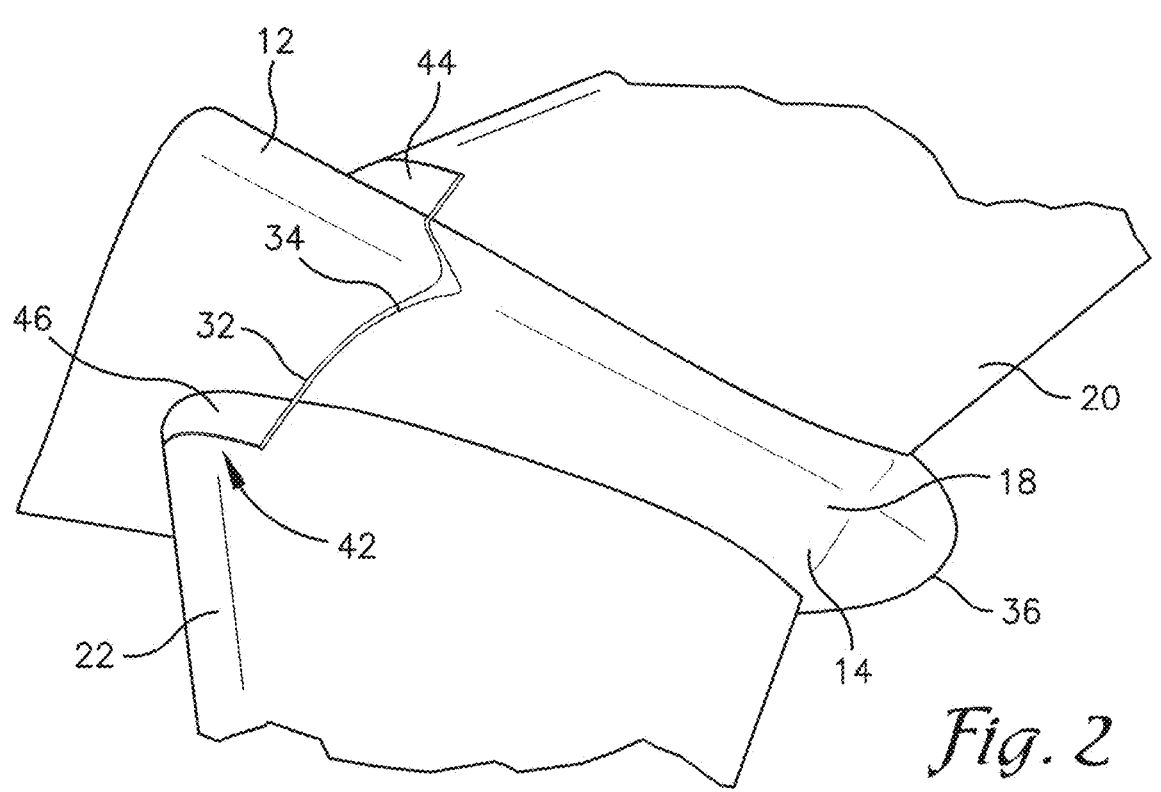
FIG. 2 is a close-up fragmentary top perspective view of the tail portion of FIG. 1.
Figure 6:
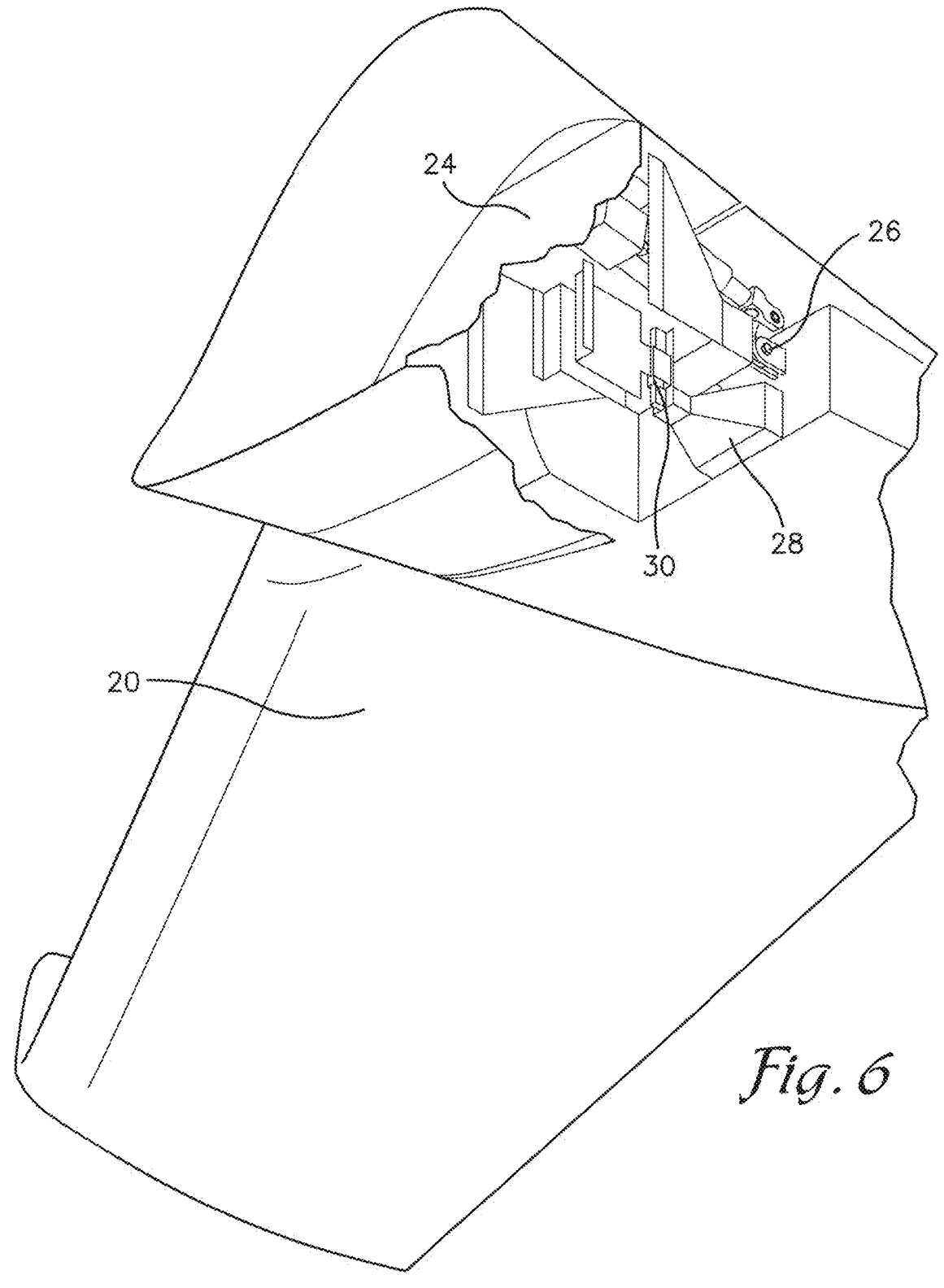
FIG. 6 is a close-up fragmentary bottom perspective view of the tail portion of FIG. 5, depicting the internal components operable for mounting and pivoting the horizontal stabilizer.

The tail structure 14 is pivotally attached to the fuselage 12 and includes the tailcone 18 aligned with the fuselage trailing end 32 of the fuselage 12 and the horizontal stabilizers 20,22 fixed to the tailcone 18 on opposing right and left sides of the tailcone 18. In some embodiments, the tailcone 18 may comprise a tailcone leading end 34 and a tailcone trailing end 36 as depicted in FIG. 2. The tailcone 18 may generally taper from the tailcone leading end 34 to the tailcone trailing end 36 that closes out the fuselage 12. In some embodiments, the tailcone leading end 34 may have a convex arcuate shape positioned at least partially within the concave arcuate shape of the fuselage trailing end 32. In some embodiments, the tailcone 18 may be removable or at least partially removable. For example, the tailcone 18 may comprise one or more fairings that can independently be removed from the tail structure 14 to gain access to the internal actuator 16, the hinge support structure 24, the yaw support structure 28, and/or the yaw fitting 30, as depicted in FIG. 6.

The horizontal stabilizers extend in opposite directions from the tailcone and may be shaped and configured to cooperatively form an H-tail or a U-tail. In some alternative embodiments, the horizontal stabilizers can include both horizontal and vertical stabilizers, such as embodiments where the horizontal stabilizers are shaped and configured to cooperatively form a V-tail. Each of the horizontal stabilizers may have a stabilizer leading edge and a stabilizer trailing edge. The horizontal stabilizers may have attached and/or integral thereto vertical stabilizer portions 38,40 as depicted in FIG. 1. For example, the vertical stabilizer portions 38,40 of a U-tail configuration, as depicted in FIG. 1, may be located at opposing ends of the two horizontal stabilizers 20,22, opposite of ends at which the two horizontal stabilizers 20,22 are attached to the tailcone 18 and/or to each other.

In some embodiments, the tailcone is integrally formed with the horizontal stabilizers, while in other embodiments the horizontal stabilizers are mechanically fixed to the tailcone or otherwise fixedly attached thereto. Furthermore, in some embodiments, portions of each of the stabilizers 20,22 extend forward of the fuselage trailing end 32 and/or forward relative to the tailcone leading end 34. Specifically, the tail structure 14 may include a notch 42 sized and shaped for receiving a portion of the fuselage 12 therein. The notch 42 can be formed between the stabilizer leading edges and/or at least partially into each of the stabilizer leading edges, with at least a portion of the tailcone leading end 34 set back relative to a forward-most portion of the stabilizer leading edges, as depicted in FIG. 2.

In some embodiments, protrusions 44,46 may extend outward from opposing left and right sides of the fuselage 12 at or proximate to the fuselage trailing end 32 and may provide a flat or substantially flat surface facing similar flat or substantially flat inward-facing surfaces of the horizontal stabilizers 20,22 at or proximate to the stabilizer leading edges. For example, the protrusions 44,46 may form a portion of the stabilizer leading edges that are fixed to the fuselage 12 and do not move along with the stabilizers 20,22. In this configuration, the notch 42 receives the fuselage and the protrusions 44,46 between the inward facing surfaces of the horizontal stabilizers 20,22. The protrusions 44,46 may alternatively not have a flat surface but rather a curved surface or any surface minimizing the resulting gap between the tail structure 14 and the fuselage 12 during actuation of the tail structure 14.

In some embodiments, the hinge support structure is fixed at least partially within the fuselage, pivotally coupling the fuselage and the tail structure. For example, the hinge support structure may comprise and/or attach to a hinge (e.g., the at least one pivot point 26). The hinge may pivotally couple the tail structure to the fuselage. In some embodiments, the hinge support structure further comprises or is affixed to the yaw support structure 28 and/or the yaw fitting 30. The yaw support structure and/or the yaw fitting are configured to prevent or limit yaw movement of the tail structure 14. The yaw fitting 30 may be, for example a "blade" fitting where rotation is allowed along a sweeping surface and the yaw load is taken out between two linear supports (e.g., the yaw support structure 28) resting on each other with friction reducing materials on wear surfaces thereof. Additionally or alternatively, a "scissor" fitting can be used which includes two modulating fittings which allow for rotation but the fittings prevent any yawing motion. However, other components and techniques for limiting or preventing yaw motion of the tail structure 14 may be utilized without departing from the scope of the technology disclosed herein.

The internal actuator (or internal actuators) actuates the tail structure 14, rotating the stabilizer leading edge up and down relative to the fuselage, thereby trimming the horizontal stabilizers for aircraft stabilization. In some embodiments, the internal actuator is fixed to the fuselage and/or the hinge support structure. In other alternative embodiments, the internal actuator is fixed to the tail structure 14. The internal actuator may be an electromechanical or hydraulic actuator and may be configured as a dual load path single ram, a dual ram with a single load path for each ram, or any other actuator known in the art for triggering a pivotably or rotatably attached component to pivot or rotate. In some embodiments, the internal actuator is configured to operate in a linear fashion, extending to rotate the stabilizer leading edges up and retracting to rotate the stabilizer leading edge down.

In some embodiments, an aircraft control system (not shown) may be communicably coupled to the internal actuator or actuators to provide trimming instructions or other such operational signals thereto. For example, the aircraft control system may comprise one or more processors or processing elements (not shown) electrically, operationally, communicably, or functionally coupled with the internal actuator.

In use, the aircraft control systems and/or pilots of the aircraft trim the stabilizers 20,22 for horizontal and/or vertical stabilization of the aircraft via actuation of the tail structure 14. Specifically, in one example method, trimming an aircraft stabilizer may include sending a control signal (e.g., such as from an aircraft control system or via input from a pilot) to the internal actuator 16, receiving the control signal with the internal actuator 16, and activating actuation of the internal actuator 16 in response to receiving the control signal. The internal actuator 16, in response to this actuation, rotates the tail structure 14 up and/or down relative to the fuselage 12.

Figure 7:
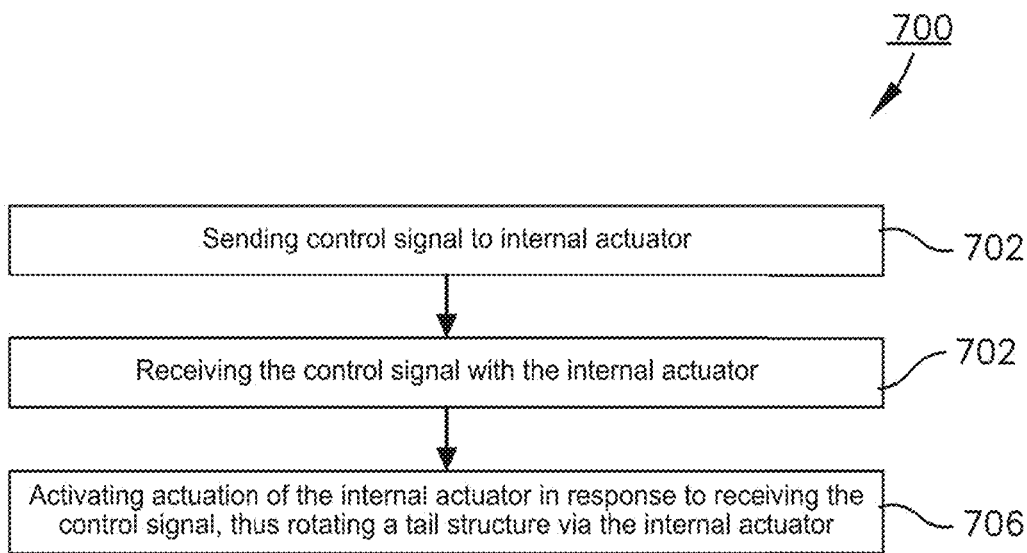
FIG. 7 is a method for trimming a horizontal stabilizer of an aircraft tail in accordance with one embodiment of the present disclosure.

The flow chart of FIG. 7 depicts the steps of an exemplary method 700 for trimming an aircraft stabilizer in more detail. For example, the method may be used for pivoting or rotating the horizontal stabilizers 20,22 (e.g., the leading stabilizer edges thereof) from a first position or a first orientation (as in FIG. 3A) to a second position or second orientation (as in FIG. 3B). In some embodiments, various steps may be omitted, or steps may occur out of the order depicted in FIG. 7 without departing from the scope of the technology as described herein. For example, two blocks shown in succession in FIG. 7 may in fact be executed substantially concurrently, or blocks may sometimes be executed in the reverse order depending upon the functionality involved.

In some embodiments, as depicted in FIG. 7, the method 700 includes the steps of sending a control signal (e.g., such as from an aircraft control system or via input from a pilot) to the internal actuator 16, as depicted in block 702, receiving the control signal with the internal actuator 16, as depicted in block 704, and activating actuation of the internal actuator 16 in response to receiving the control signal, as depicted in block 706. As described above, the convex arcuate shape of the tailcone leading end 34 is rotatable within the concave arcuate shape of the fuselage trailing end 32 during the rotating of the tail structure up or down. Furthermore, the rotating of the tail structure rotates the stabilizer leading edge of the horizontal stabilizers up and down relative to the fuselage (e.g., along an arcuate path or a circular path), with the tailcone fixed to the horizontal stabilizers rotating along with the horizontal stabilizers.

Figure 3A:
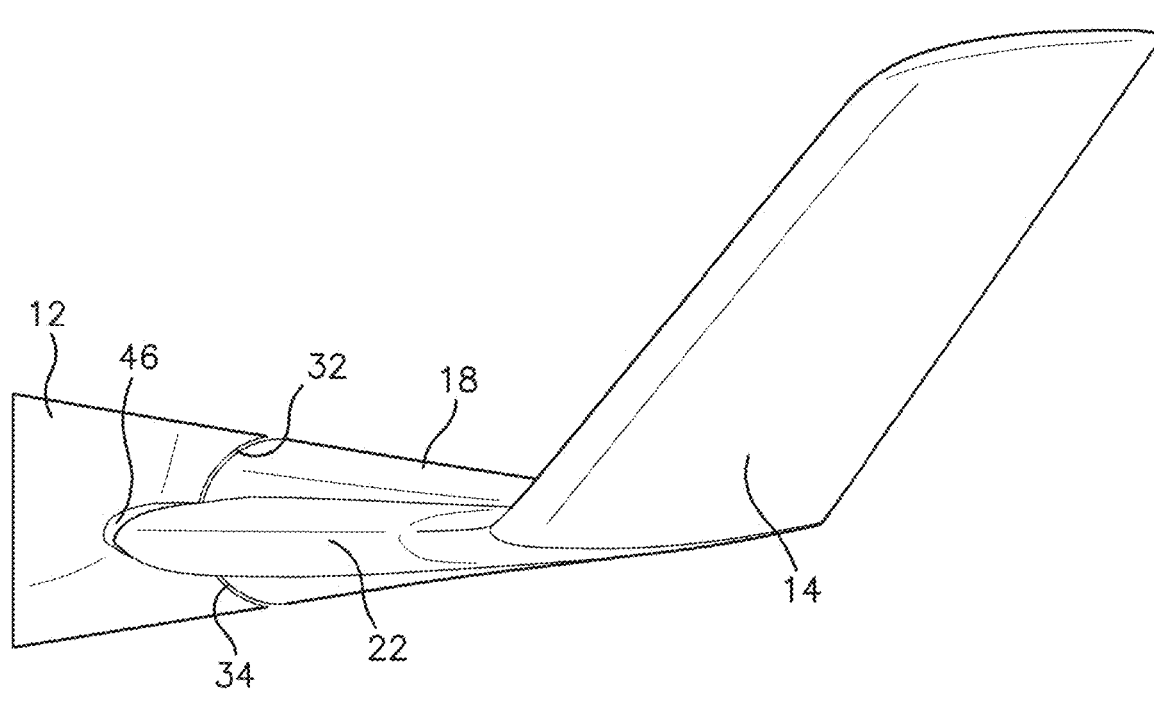
FIG. 3A is a side plan view of the tail portion of FIG. 1 with a horizontal stabilizer in a first orientation in accordance with embodiments of the present disclosure.
Figure 3B:
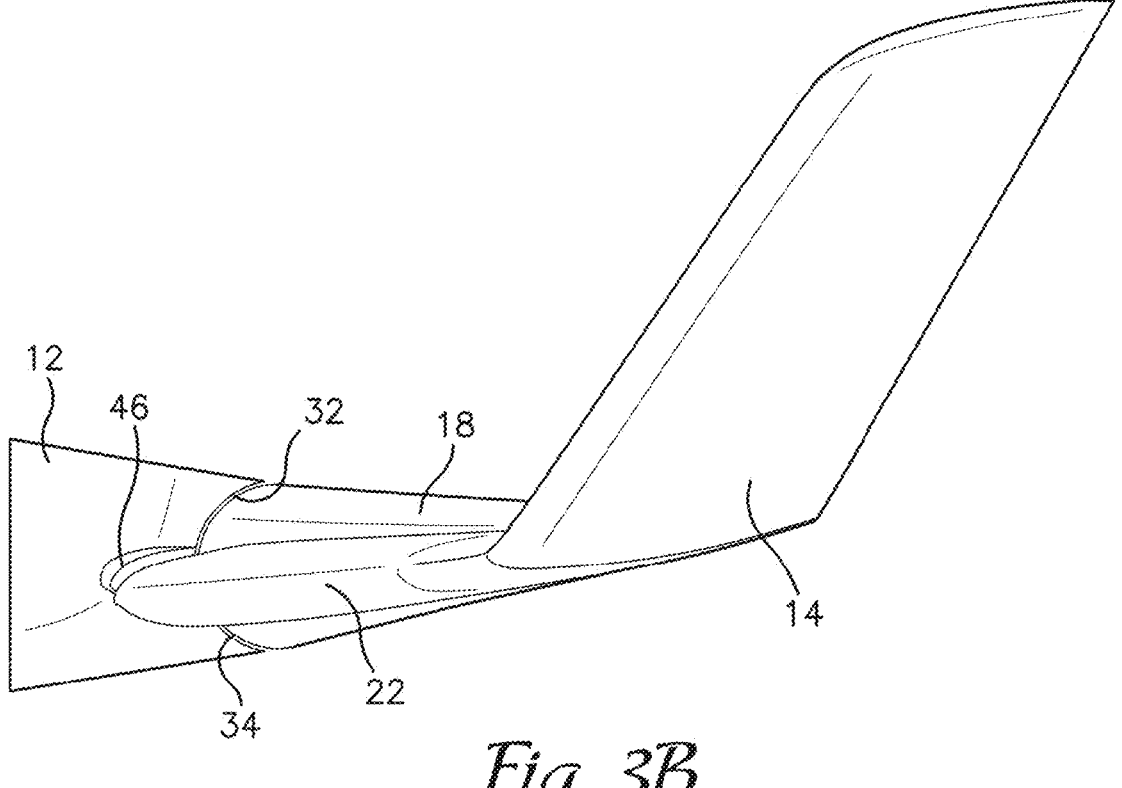
FIG. 3B is a side plan view of the tail portion of FIG. 3A with the horizontal stabilizer pivoted to a second orientation in accordance with embodiments of the present disclosure.
Figure 4:
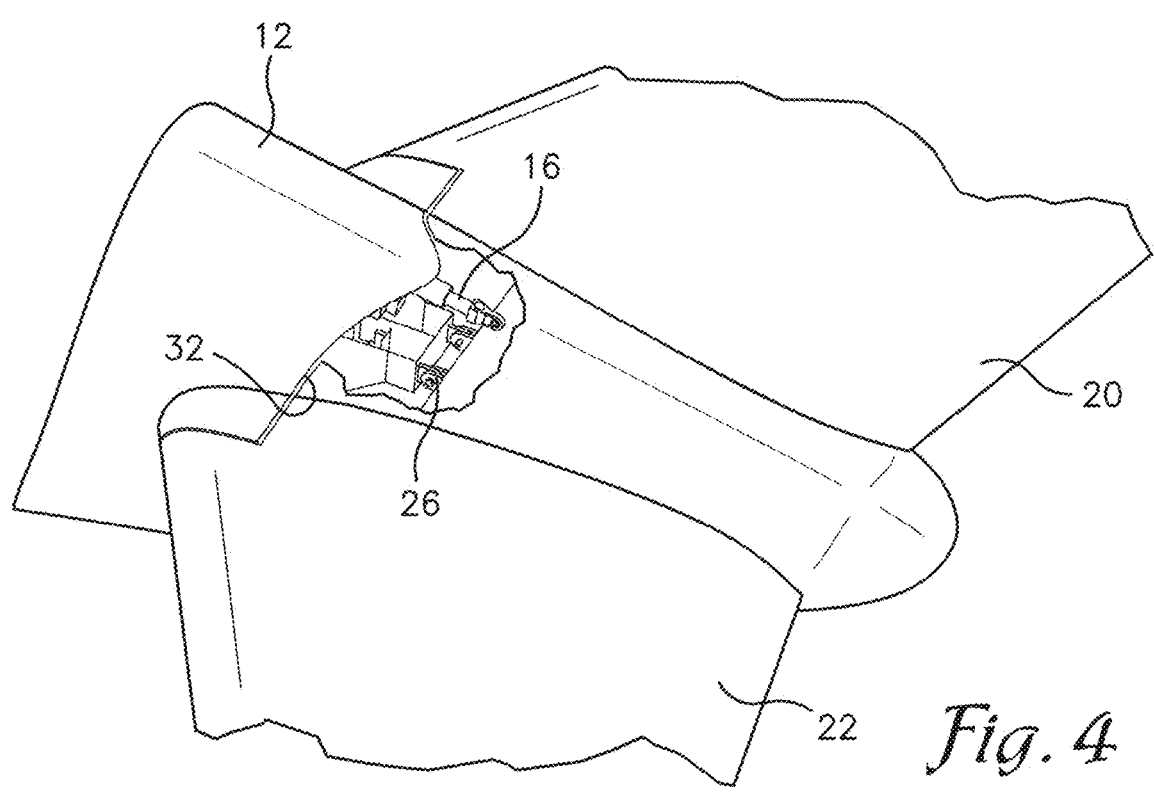
FIG. 4 is a close-up fragmentary top perspective view of the tail portion of FIG. 2, with a fuselage fairing removed.
Figure 5:
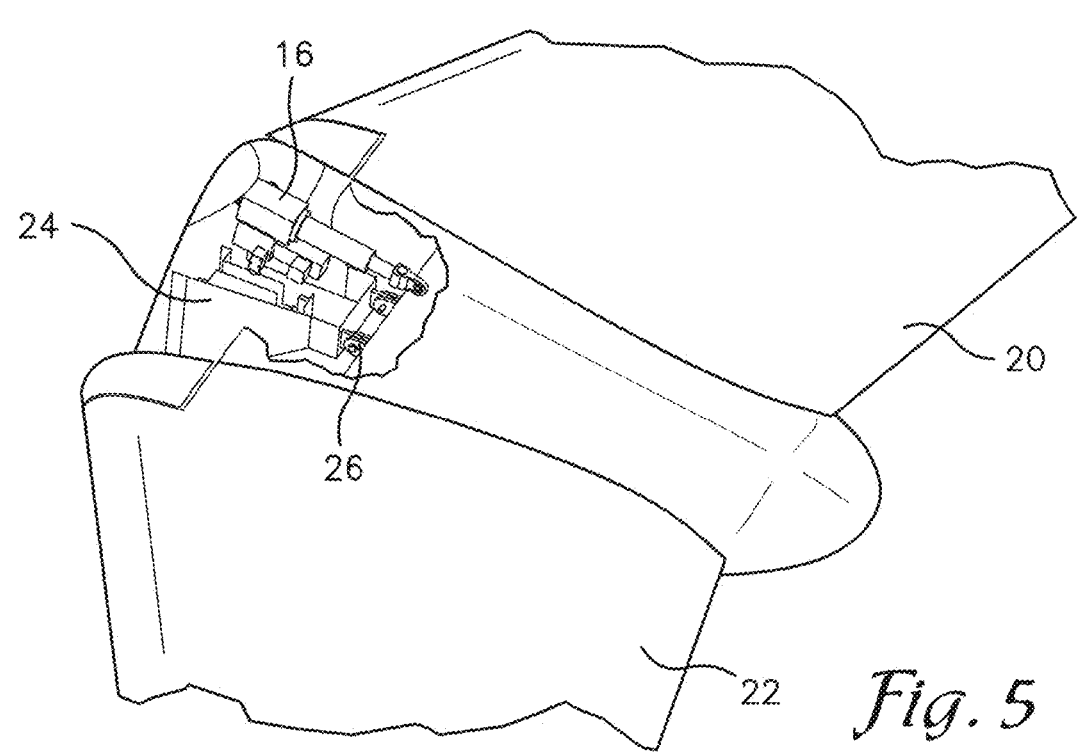
FIG. 5 is a close-up fragmentary top perspective view of the tail portion of FIG. 4 with the fuselage removed to reveal internal components operable for mounting and pivoting the horizontal stabilizer.

By including the tailcone 18 of the fuselage 12 with the stabilizers 20,22, some or all of the internal actuator 16, the hinge or pivot point 26, the hinge support structure 24, the yaw support structure 28, and/or the yaw fitting 30 are reconfigured to fit within a wider portion of the fuselage 12 (e.g., the fuselage loft). This is advantageous over prior art aircrafts where these components would be required to fit into a thinner horizontal stabilizer loft section of the fuselage (e.g., into a narrow portion of the prior art fixed tailcone where the stabilizers are traditionally attached). Furthermore, the trimmed/actuated portion of the fuselage (e.g., the tailcone 18) being added to the horizontal stabilizers 20,22 (e.g., fixed thereto) eliminates the issue of the relative motion of the stabilizers with the prior art's fixed tailcone skin, thus eliminating the need for a traditional wiper. By trimming or actuating the skin of the tailcone 18 on an arcuate or circular profile around the pivot point 26, the resulting gap between the tailcone 18 and the fuselage 12 is minimized as the tail structure is actuated. As depicted in FIGS. 3A and 3B, as the horizontal stabilizers 20,22 are trimmed, the gap between the fuselage 12 and the tailcone 18 remains constant or relatively constant and there is minimal impact to overall aircraft drag. Additionally, in some embodiments a seal or overlap on the fuselage 12 and/or the tail structure 14 may be provided to help keep closeout between the two structures.

Other Considerations

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processor or a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "control system," "processor", "processing element", or equivalents should be understood to encompass a tangible entity, be that an entity that is physically constructed, permanently configured (e.g., hard-wired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

1. An aircraft structure comprising:

a fuselage;

a tail structure pivotally attached to the fuselage, the tail structure comprising:

a tailcone having a closed out trailing end and a leading end opposite the closed out trailing end, wherein the fuselage has a fuselage trailing end having a concave arcuate shape and the leading end has a convex arcuate shape positioned at least partially within the concave arcuate shape of the fuselage trailing end, and at least two stabilizers fixed to the tailcone; and internal actuators, wherein the internal actuators are configured to rotate the tail structure up and down along an arcuate path about a single axis relative to the fuselage while maintaining closeout of the fuselage with the tailcone.

2. The aircraft structure of claim 1, wherein the tailcone is integrally formed with the at least two stabilizers.

3. The aircraft structure of claim 1, wherein the at least two stabilizers are shaped and configured to cooperatively form a U-tail, an H-tail, or a V-tail.

4. The aircraft structure of claim 1, wherein the at least two stabilizers are horizontal stabilizers.

5. The aircraft structure of claim 1, further comprising a hinge pivotally coupling the tail structure to the fuselage.

6. The aircraft structure of claim 1, wherein portions of each of the at least two stabilizers extend forward of the fuselage trailing end and forward relative to the leading end of the tailcone throughout rotation of the tail structure along the arcuate path.

7. The aircraft structure of claim 1, further comprising a hinge support structure fixed to the fuselage and pivotally coupled to the tail structure.

8. The aircraft structure of claim 7, wherein the hinge support structure further comprises or is affixed to at least one of a yaw support structure and a yaw fitting.

9. The aircraft structure of claim 1, wherein the tail structure includes a notch sized and shaped for receiving a portion of the fuselage therein.

10. An aircraft structure comprising:

a fuselage, wherein the fuselage has a fuselage trailing end;

a tail structure pivotally attached to the fuselage, the tail structure comprising:

a tailcone configured to serve as a closeout fairing for the fuselage, wherein the tailcone comprises a tapered tailcone trailing end and a tailcone leading end opposite the tapered tailcone trailing end, and horizontal stabilizers fixed to the tailcone and each having a stabilizer leading edge and a stabilizer trailing edge, wherein the horizontal stabilizers extend in opposite directions from the tailcone, forming an H-tail or a U-tail configuration;

a hinge support structure fixed at least partially within the fuselage, pivotally coupling the fuselage and the tail structure; and at least one internal actuator, wherein the at least one internal actuator is configured to rotate the stabilizer leading edge up and down along an arcuate path relative to the fuselage while maintaining closeout of the fuselage with the tailcone, wherein the fuselage trailing end has a concave arcuate shape and the tailcone leading end has a convex arcuate shape positioned at least partially within the concave arcuate shape of the fuselage trailing end, such that the convex arcuate shape of the tailcone leading end is rotatable within the concave arcuate shape of the fuselage trailing end while maintaining a relatively constant gap between the fuselage trailing end and the tailcone leading end throughout rotation along the arcuate path.

11. The aircraft structure of claim 10, wherein the tailcone is integrally formed with the at least two stabilizers.

12. The aircraft structure of claim 10, wherein the stabilizer leading edges extend forward of the fuselage trailing end and forward relative to the tailcone leading end throughout rotation along the arcuate path.

13. The aircraft structure of claim 10, wherein the hinge support structure further comprises or is affixed to at least one of a yaw support structure and a yaw fitting.

14. The aircraft structure of claim 10, wherein the tail structure includes a notch sized and shaped for receiving a portion of the fuselage therein.

15. A method of trimming an aircraft stabilizer for vertical or horizontal stabilization during flight, the method comprising:

sending a control signal to at least one internal actuator;

receiving the control signal with the at least one internal actuator; and activating actuation of the at least one internal actuator in response to receiving the control signal, wherein the at least one internal actuator is configured to rotate a tail structure up or down along an arcuate path relative to the fuselage, wherein the tail structure is rotatably attached to the fuselage and comprises:

a tailcone aligned with a trailing end of the fuselage and configured to maintain closeout of the fuselage with the tailcone throughout rotation up or down along the arcuate path, and horizontal stabilizers fixed to the tailcone, wherein the horizontal stabilizers extend in opposite directions from the tailcone, forming an H-tail or a U-tail configuration, wherein the tailcone comprises a tapered tailcone trailing end and a tailcone leading end opposite the tapered tailcone trailing end, wherein the fuselage has a fuselage trailing end having a concave arcuate shape and the tailcone leading end has a convex arcuate shape positioned at least partially within the concave arcuate shape of the fuselage trailing end, such that the convex arcuate shape of the tailcone leading end is rotatable within the concave arcuate shape of the fuselage trailing end during the rotating of the tail structure up or down while maintaining a relatively constant gap between the fuselage trailing end and the tailcone leading end throughout rotation along the arcuate path.

16. The method of claim 15, wherein the rotating of the tail structure rotates the stabilizer leading edge of the horizontal stabilizers up and down relative to the fuselage, with the tailcone fixed to the horizontal stabilizers rotating along with the horizontal stabilizers.

* * * * *